United States Patent [19]
Mitchell

[11] 4,353,169
[45] Oct. 12, 1982

[54] MULTIPLE HOLE GAUGING TOOL

[75] Inventor: Ernest M. Mitchell, Tulsa, Okla.

[73] Assignee: Rodney M. Mitchell, Tulsa, Okla.

[21] Appl. No.: 161,421

[22] Filed: Jun. 20, 1980

[51] Int. Cl.³ .............................................. G01B 5/14
[52] U.S. Cl. ................................... 33/173; 33/178 B; 33/169 R
[58] Field of Search ................ 33/178 B, 173, 143 R, 33/143 M, 143 J, 143 K, 158, 159, 160, 147 T, 147 J, 169 R

[56] References Cited

U.S. PATENT DOCUMENTS

| | | | |
|---|---|---|---|
| 2,419,752 | 4/1947 | Zumbuhl | 33/158 |
| 2,693,033 | 11/1954 | Acker et al. | 33/158 |

FOREIGN PATENT DOCUMENTS

| | | | |
|---|---|---|---|
| 357529 | 8/1922 | Fed. Rep. of Germany | 33/178 B |
| 927952 | 5/1947 | France | 33/143 M |

*Primary Examiner*—Harry N. Haroian
*Attorney, Agent, or Firm*—Head, Johnson & Stevenson

[57] ABSTRACT

A multiple hole gauging tool for use with a variety of straight-edge members, comprising an elongated rod having a transverse slot aperture therethrough for slidably receiving a straight-edge member therethrough, a threaded stud member at one end of the rod adjacent the slot aperture, a cap member threadedly carried by the stud member and being tightenable against the straight edge for locking the rod at a selected position along the straight edge, the cap member having a cylindrical hole engagement surface around the outer periphery thereof. The rod member is provided with a window aperture for reading indicia on the straight edge while the outer surface of the cap member comes in several different sizes to fit different diameter holes. Insert members are provided for effectively changing the size of the aperture to accommodate different size straight edges.

7 Claims, 15 Drawing Figures

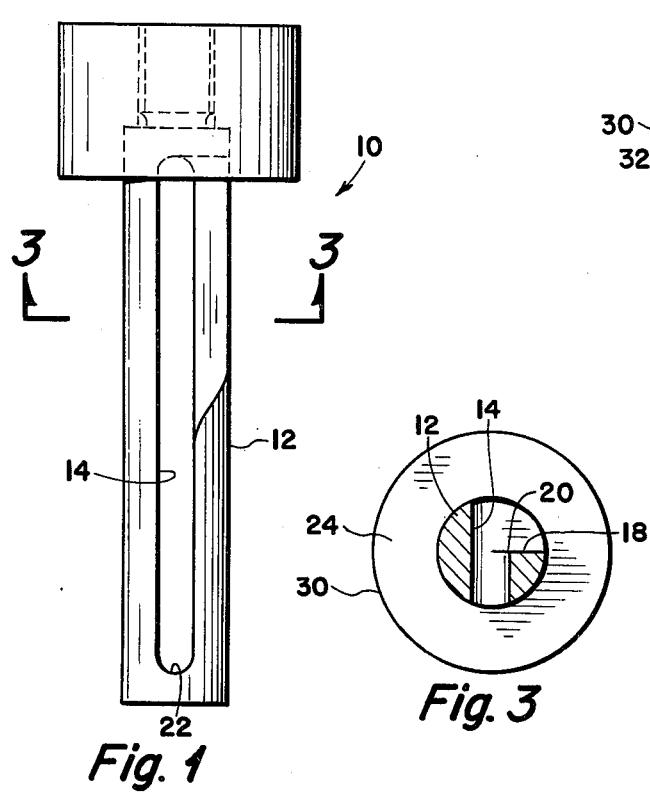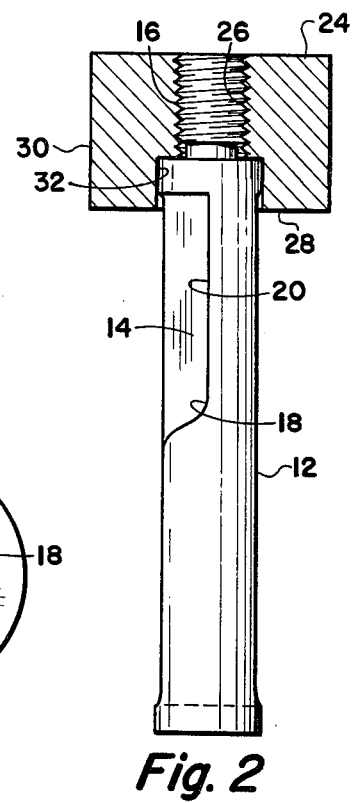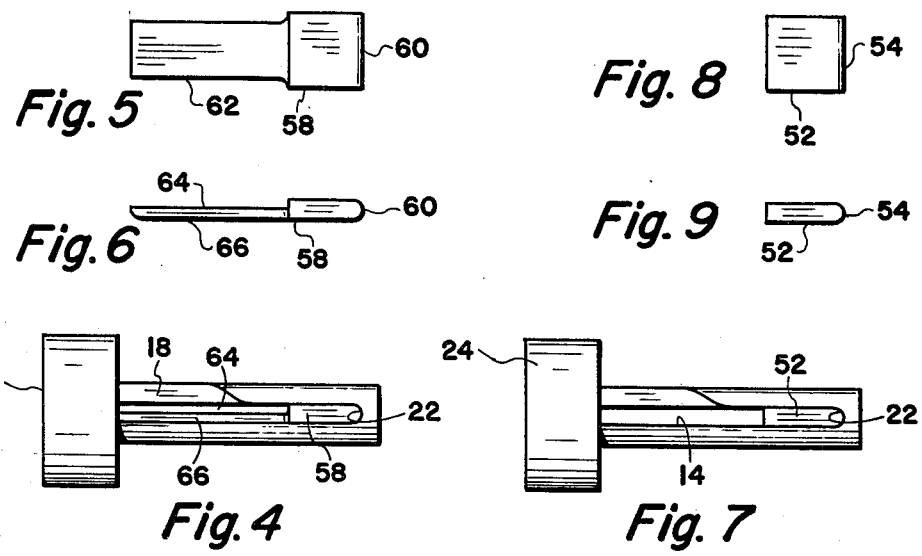

MULTIPLE HOLE GAUGING TOOL

BACKGROUND OF THE INVENTION

1. Field of the Invention

The present invention relates to a hole gauging tool and more particularly, but not by way of limitation, to a hole engagement member which may be slidably carried by a straight edge and is lockable with respect to said straight edge.

2. History of the Prior Art

In the construction industry, and particularly in the construction of steel frame structures, buildings and the like, the I-beams, channel beams and other structural members are pre-designed and fabricated for installation at the building site. These frame members are typically assembled with the use of bolts or rivets which are passed through pre-drilled holes in the frame member itself or by holes provided in flanges which are pre-welded to these structural iron members.

For example, when I-beams are used in the construction of the framework for buildings, the I-beams may be mounted in end-to-end relationship or attached to cross I-beam members by first cutting the I-beams to the desired length and shape and then by mounting attachment flanges at the ends of the I-beam. These attachment flanges must be positioned accurately on the I-beam prior to being welded thereto.

It is necessary that the hole patterns provided in the flange members be rather accurately located with respect to the I-beam members so that when the beam is hoisted into place, the hole patterns will match up so that bolts, rivets or the like can be used for attaching the pieces together. Heretofore, these flanges were positioned at the ends of the I-beams by the use of multiple measurement techniques to make sure that the holes are properly positioned with respect to the end of the I-beam. Later, usually before the beam is moved to the building site, inspectors have to re-measure the exact location of the holes and the flange members in order to insure a proper fit when the beam is hoisted into place.

If the hole is in the wrong place, the hole must usually be filled using welding techniques and then redrilled properly. On the other hand, if the flange is out of position, it must be cut loose from the I-beam and rewelded in its proper location.

The measurement in initially locating the flanges at the end of the I-beam and the subsequent measurements due to inspection of the hole patterns are extremely time consuming and represent a major cost of labor in producing materials for these building structures.

Further, it is often necessary to weld flange members at various angles on the I-beam in order to provide joints for the irregular shaped building structures. These activities are again very time consuming from the point of making measurements for each flange member and each hole drilled in the flange member or in the I-beam itself.

Further, typically for both operations hereinbefore mentioned there are several beams with attachment flanges having identical hole patterns but again, often there are not enough of them to justify the manufacture of a jig fixture for each hole pattern. Hence, present day operations are done manually simply with the use of various standard squares and measurement rules which often results in the user failing to duplicate the necessary hole patterns on various identically formed structural members.

SUMMARY OF THE INVENTION

The present invention provides a multiple hole gauging tool which may be utilized with a variety of straight edge members such as machinist squares, carpenters squares, bevel angle measuring tools and the like.

The device comprises an elongated rod member having a transverse slot aperture therethrough which is large enough for slidably receiving a variety of straight edge members therein. The effective size of the slot aperture may be varied by the use of shaped inserts which may be placed in the slot in order to accommodate the various sized measurement and squaring instruments.

One end of the rod member adjacent one edge of the slot aperture is provided with a threaded stud member in alignment with the center line axis of the rod.

A cylindrical cap member is threadedly carried by the stud member. A plurality of cap members may be provided having different diameters to accommodate different hole sizes. The inner edge surface of the cap member is provided with a straight edge engaging surface so that when the cap member is fully tightened onto the rod with a straight edge in place, the edge engaging surface locks against the edge of the straight edge in order to lock the rod into a particular desired position on the straight edge surface.

The cap member further comprises a recess in the straight edge engagement surface which has an axis coincident with the stud member and the center line of the rod member for receiving the end of the rod member therein to insure that the straight edge engagement portion is able to reach the edge of the straight edge which is within the slot.

The rod member is also provided with a cut-out window which is in communication with the slot aperture and which provides an edge member which is parallel with the center line axis of the rod and in alignment with the center line axis when viewed perpendicular to the plane of the slot aperture. This window member with its edge portion is suitable for positioning along a straight edge having measurement indicia therealong so that the measurement indicia can be read directly through the cut-out window.

Therefore, in use, when a pre-drilled flange member is to be attached to the end of an I-beam or to some other structural steel surface, the hole gauging tool may be attached to a squaring instrument at a distance to which the hole is to be positioned from one surface of the I-beam. The square then is put in place with respect to the I-beam and the flange member then is moved into position so that the hole thereof engages the cylindrical surface of the cap of the hole gauging tool.

The flange member is now in exact position with respect to the end of the I-beam and may be held in place while welded thereto. Later, after the structures have been pre-formed, inspectors may use the hole gauging tool along with a straight edge or other measuring instrument, in order to check the location of the hole patterns along the I-beam or of the I-beam end attachment flanges. Therefore, uniformity is achieved along with a drastic saving of man hours in the performance of these measurement functions.

DESCRIPTION OF THE DRAWINGS

Other and further advantageous features of the present invention will hereinafter more fully appear in connection with a detailed description of the drawings in which:

FIG. 1 is a side view of a hole gauging tool embodying the present invention.

FIG. 2 is a top plan view of the device of FIG. 1 rotated 90°.

FIG. 3 is an end sectional view taken along the broken lines 3—3 of FIG. 1.

FIG. 4 depicts the device of FIG. 1 with a first embodiment of an insert therein.

FIG. 5 is a plan view of the insert in FIG. 4.

FIG. 6 is a side view of the insert of FIG. 4.

FIG. 7 depicts the device of FIG. 1 having a second embodiment of an insert therein.

FIG. 8 is a plan view of the insert of FIG. 7.

FIG. 9 is a side view of the insert of FIG. 7.

DESCRIPTION OF THE PREFERRED EMBODIMENTS

Figure 10:
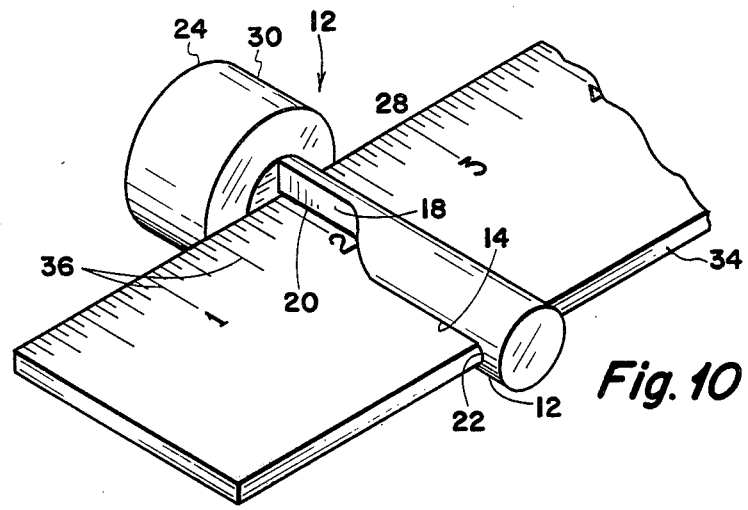
FIG. 10 depicts the device attached to a straight edge measuring implement.

Referring to the drawings in detail reference character 10 generally indicates a multiple hole gauging tool comprising an elongated rod member 12 having a transverse slot aperture 14 therethrough. One end of the rod 12 is provided with a threaded stud member 16 having center line axis coincident with the center line axis of the rod 12.

A portion of the rod member 12 is provided with a cutout window 18 which forms an elongated longitudinal edge surface 20 which is parallel to the center line axis of the rod 12 and in alignment therewith when viewed perpendicular to the plane of the slot 14 as shown in FIG. 2. It is further noted that the slot aperture 14 is closed at the outer end 22 thereof for a purpose that will be hereinafter set forth.

The hole gauging tool 10 further comprises a cylindrical cap member 24 having a centrally disposed threaded aperture 26 therein for threadedly receiving the stud member 16. The cap member is provided with an inner surface as will be hereinafter set forth. The outer periphery of the cap member 24 is provided with a circular cylindrical surface 30 which is typically sized to fit standard sized holes used in the construction business. It is noted at this point that there are several standard sized holes used in construction and hence, various sized cap members 24 may be utilized with the rod 12 in order to accommodate these different hole sizes.

A cylindrical recess 32 is provided in the inner surface of the cap member 24 and is large enough to freely receive the inner end of the rod 12 therein as shown in FIGS. 1 and 2.

Figure 11:
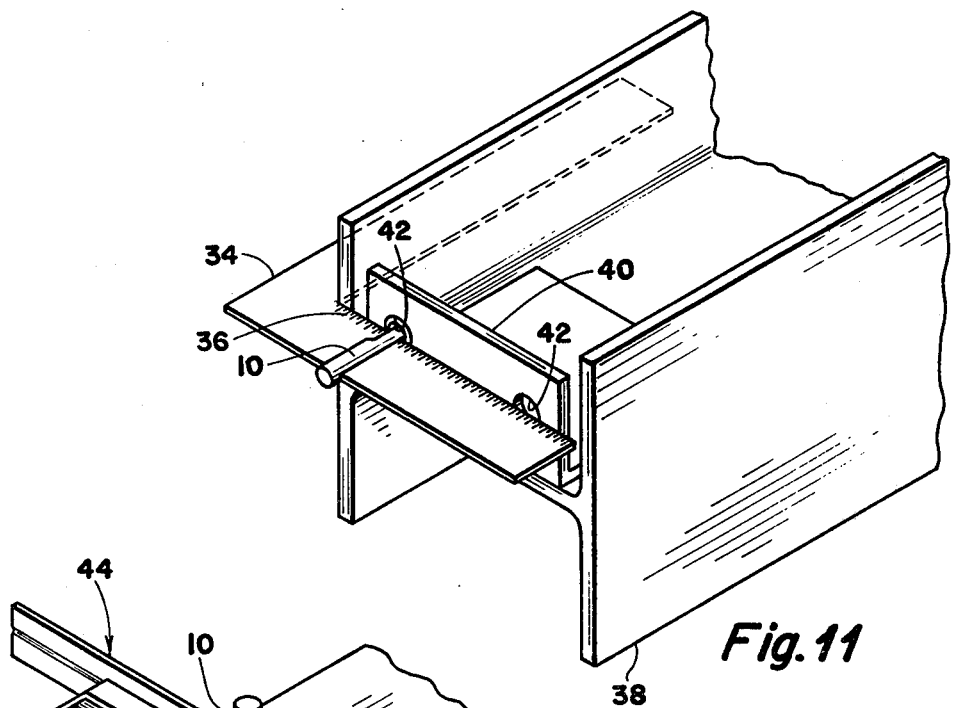
FIG. 11 depicts the use of the device in locating flange holes.

Referring now to FIGS. 10 and 11, the hole gauging member 10 is shown attached to one straight edge surface of a square 34. The square being provided with a plurality of measurement indicia 36. It can be seen that the straight edge member 34 may be inserted through the slot aperture 14 and the rod 12 may be positioned along the straight edge at the proper place by use of the cut-out window 18 and its associated straight edge portion 20. Once the rod member 12 is positioned in place along the straight edge 34, the cap member 24 is then threadedly tightened on the stud member 16 until the straight edge engagement surface 28 tightly contacts the edge of the straight edge. This naturally forces the opposite edge of the straight edge into contact with the outer end of the slot 22. The center line axis of the hole engagement surface 30 is then directly in line with the measurement indicia straight edge 20.

Referring to FIG. 11, reference character 38 depicts an I-beam member wherein a right angled flange member 40 is located at one end thereof. The flange 40 may be provided with two or more holes 42 which must be accurately positioned with respect to the end of the I-beam 38. It can be seen by referring to FIG. 11 the method in which the square 34 having the hole gauging tool 10 attached thereto may be utilized to locate the proper hole 42 and insure its proper distance and orientation with respect to the side of the I-beam 38.

Figure 12:
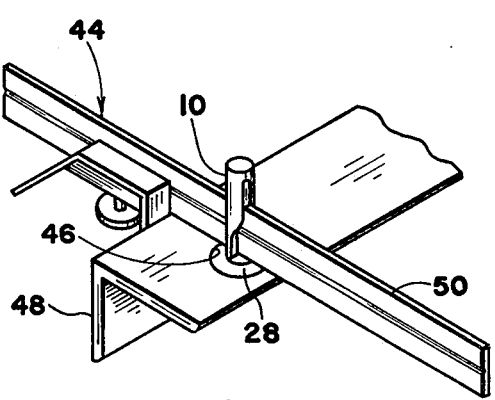
FIG. 12 depicts the device being utilized to locate a hole in an angle iron piece.

Referring now to FIG. 12 it can be seen that often the hole engagement tool 10 is called upon to be utilized with a different measuring or squaring device such as the machinist square 44 shown. The use shown in FIG. 12 is to properly locate or measure the location of a hole 46 which is provided in an angle iron member 48. The machinist's square 44 is provided with a straight edge member 50 which can be seen to be smaller than the straight edge portion of the square 34. Assuming the thickness of the straight edge member 50 of the machinist's square 44 is approximately the same thickness as the square 34, a shaped insert 52 may be utilized to effectively reduce the size of the slot aperture 14 to accommodate the square 50.

Referring to FIGS. 7, 8 and 9, it can be seen that the insert 52 may be of a basic rectangular shape having approximately the same width as the slot 14. One end 54 of the insert may be rounded to conform to the shape of the outer end 22 of the slot 14 as shown in FIG. 7. The use of this insert will then permit the straight edge member 50 to be inserted therein so that one edge of the straight edge member 50 may be contacted by the straight edge engagement surface 28 for purposes of tightening the hole gauging member at the proper location along the straight edge 50.

Figure 13:
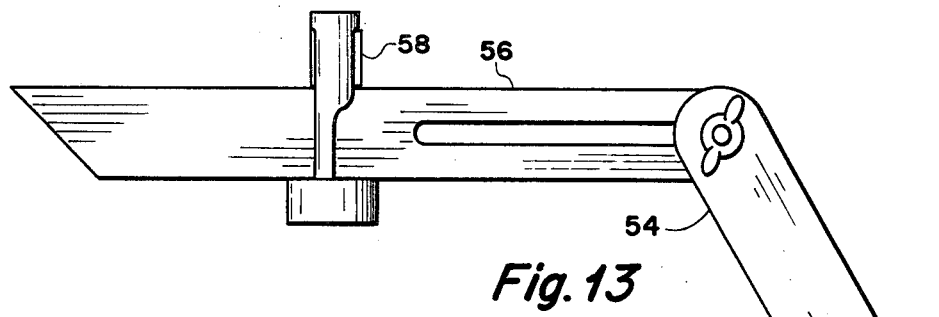
FIG. 13 depicts the device attached to a bevel measuring device.
Figure 14:
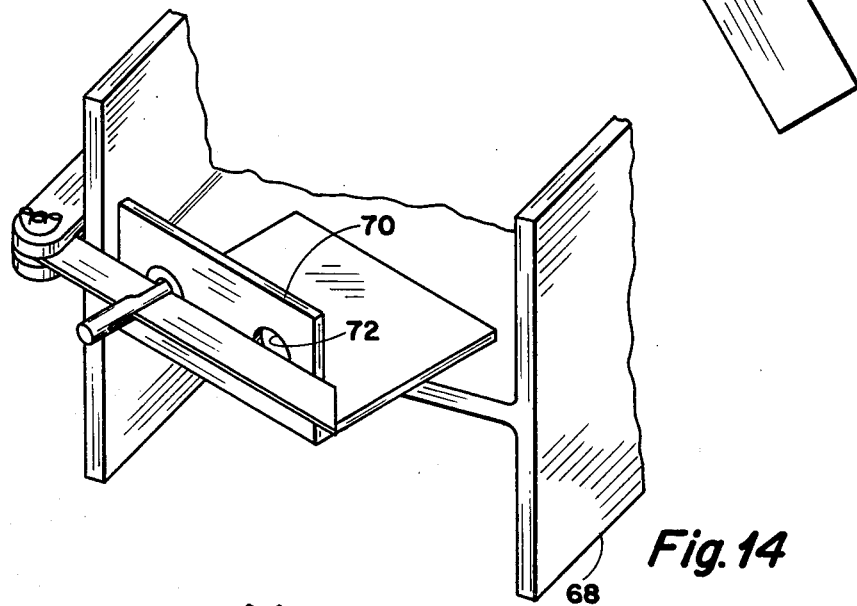
FIG. 14 depicts the device being used to locate a flange at an angle.

Referring now to FIGS. 13 and 14, reference character 54 indicates a bevel measurement tool which is common in the industry and is provided with an elongated straight edge member 56 which may or may not be provided with measurement indicia. Often times the straight edge member 56 of the bevel device is not only narrower than the carpenter's square straight edge surface 34 but is also often thinner thereby making the slot 14 too long and too wide. In this case, a shaped insert 58 as shown in FIGS. 4, 5 and 6 may be utilized to effectively reduce the size of the slot 14.

The insert 58 is provided with a rectangular portion similar to that of the insert 52 and having a rounded end 60 for conforming to the end of the slot 22 so that it will snugly fit therein. It is noted at this point that the outer end of the slot 22 need not be rounded but could be rectangular or any other suitable shape. The inserts are made to conform to that shape so that when end pressure is applied by the cap, it will stay firmly in place. The insert 58 is also provided with an elongated extension member 62 having opposite surfaces 64 and 66 so that the surface 66 is co-planar with one surface of the insert portion 58 while the surface 64 is recessed with respect to the opposite surface of the insert 58. The extension member 62 along with the main body of the insert 58 is of a length compatible with the length of the slot 14.

When the insert is placed within the slot 14 as shown in FIG. 4, the surface 64 is oriented to face the cut-out window 18 so that when the straight edge is inserted therein, it will be visible through the cut-out window 18. Referring back to FIGS. 13 and 14, reference character 68 generally indicates the end of an I-beam wherein, in this case, a right angle flange member 70 having holes 72 therein is to be placed at a pre-determined angle with respect to the side of the I-beam 68. FIG. 14 shows the method in which the multiple hole gauging tool may be mounted on the bevel measuring tool 54 in order to properly position the flange 70 for attachment to the I-beam.

Figure 15:
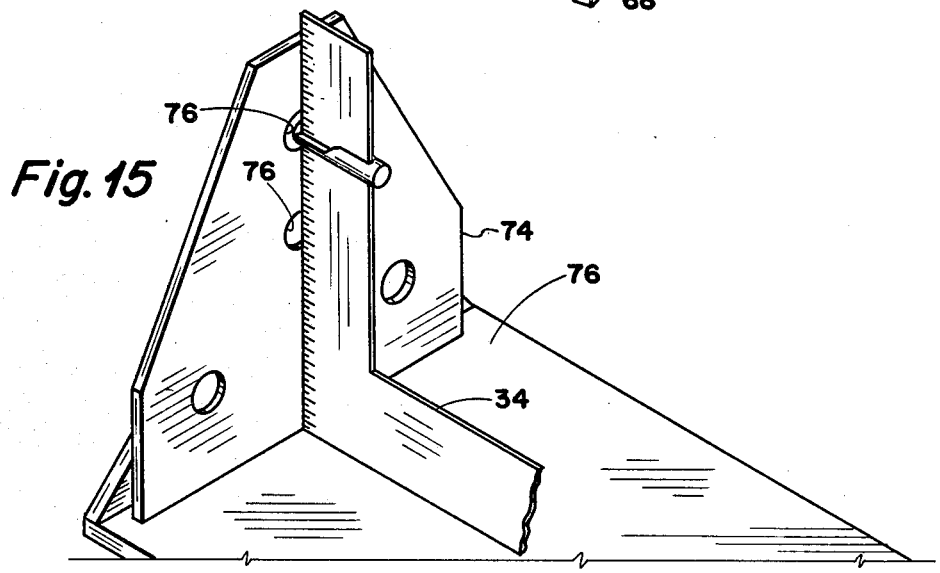
FIG. 15 depicts the device being used in squaring a plate member.

FIG. 15 depicts the hole gauging tool being utilized with the square 34 in order to properly orient a flat plate member 74 having holes 76 therein. In this case the plate member 74 is being oriented with respect to an I-beam surface 76 in the general manner that has hereinbefore been set forth.

It is noted that whereas the multiple hole gauging tool 10 is particularly effective in use in steel work, the device could just as well be used by carpenters in locating drill points and the like for building houses, assembling cabinets or other such work.

From the foregoing it is apparent that the present invention provides a multiple hole gauging tool which is adaptable for use with various sized straight edge devices and by the use of inter-changeable cap members 28 may accommodate several different sized holes.

Whereas the present invention has been described in particular relation to the drawings attached hereto, other and further modifications apart from those shown or suggested herein may be made within the spirit and scope of the invention.

What is claimed is:

1. A multiple hole gauging tool for use with a variety of straight edge members, comprising:
    an elongated rod having a transverse slot aperture for slidably receiving a straight edge member therethrough, a threaded stud member at one end of the rod adjacent a first end of said slot aperture,
    a cap member having a threaded bore for receiving said stud member, a straight edge engagement surface carried by the cap member and engagable with the straight edge member for locking said rod in place along the straight edge, a smooth cylindrical hole engagement surface carried by the cap member and defining the outer peripheral surface thereof, said rod providing indicating means relating the axis of said cap member cylindrical hole engagement surface with a straight edge received in said rod.

2. A hole gauging tool as set forth in claim 1 wherein the cylindrical hole engaging surface of the cap member has center line axis coincidental with a center line axis of the rod.

3. A multiple hole gauging tool for use with a variety of straight edge members, comprising:
    an elongated rod having a transverse slot aperture for slidably receiving a straight edge member therethrough, a threaded stud member at one end of the rod adjacent a first end of said slot aperture,
    a cap member having a threaded bore for receiving said stud member, a straight edge engagement surface carried by the cap member and engagable with the straight edge member for locking said rod in place along the straight edge, and a cylindrical hole engagement surface carried by the cap member and including a cut-out window in said rod in communication with the slot aperture and having an edge parallel with the center line axis of the rod and in alignment therewith when viewed perpendicular to the plane of the slot aperture.

4. A hole gauging tool as set forth in claim 3 wherein the slot aperture is of sufficient size to receive a variety of standard size straight edges therein and including an insert pre-sized to fit into the slot aperture to effectively reduce the size of the aperture, wherein said insert is provided with means to position a straight edge member used therewith adjacent the first end of said slot aperture and to further position said straight edge in engagement with the cut-out window therein.

5. A multiple hole gauging tool for use with a variety of straight edge members, comprising:
    an elongated rod having a transverse slot aperture for slidably receiving a straight edge member therethrough, a threaded stud member at one end of the rod adjacent a first end of said slot aperture,
    a cap member having a threaded bore for receiving said stud member, a straight edge engagement surface carried by the cap member and engagable with the straight edge member for locking said rod in place along the straight edge, and a cylindrical hole engagement surface carried by the cap member, wherein the cylindrical hole engaging surface of the cap member has center line axis coincidental with a center line axis of the rod and including a plurality of cap members having different sized cylindrical hole gauging surfaces for use with different size holes.

6. A multiple hole gauging tool for use with a variety of straight edge members, comprising:
    an elongated rod having a transverse slot aperture for slidably receiving a straight edge member therethrough, a threaded stud member at one end of the rod adjacent a first end of said slot aperture,
    a cap member having a threaded bore for receiving said stud member, a straight edge engagement surface carried by the cap member and engagable with the straight edge member for locking said rod in place along the straight edge, and a cylindrical hole engagement surface carried by the cap member, wherein the cylindrical hole engaging surface of the cap member has center line axis coincidental with a center line axis of the rod, and further wherein the cap member is provided with a centrally disposed recess adjacent the straight edge engaging surface and having diameter sufficient to receive said end of the rod therein to a depth sufficient for the straight edge engagement surface to be in communication with the first end of the slot aperture.

7. A multiple hole gauging tool for use with a variety of straight edge members, comprising:
    an elongated rod having a transverse slot aperture for slidably receiving a straight edge member therethrough, a threaded stud member at one end of the rod adjacent a first end of said slot aperture, a cap member having a threaded bore for receiving said stud member, a straight edge engagement surface carried by the cap member and engagable with the straight edge member for locking said rod in place along the straight edge, and a cylindrical hole engagement surface carried by the cap member, wherein the slot aperture is of sufficient size to receive a variety of standard size straight edge members therein and including at least one insert member pre-sized to fit into the slot aperture to effectively reduce the size of the aperture such that the straight edge member is positioned adjacent said first end of the slot aperture.

* * * * *